United States Patent
Meyer et al.

(10) Patent No.: US 10,545,062 B2
(45) Date of Patent: Jan. 28, 2020

(54) MULTI AXIS LOAD CELL BODY

(71) Applicant: MTS Systems Corporation, Eden Prairie, MN (US)

(72) Inventors: Richard A. Meyer, Chaska, MN (US); Nicholas Devon LaMoore, Minneapolis, MN (US); Riley August Rogotzke, Lakeville, MN (US); Randal L. Jenniges, Bloomington, MN (US)

(73) Assignee: MTS SYSTEMS CORPORATION, Eden Prairie, MN (US)

( * ) Notice: Subject to any disclaimer, the term of this patent is extended or adjusted under 35 U.S.C. 154(b) by 313 days.

(21) Appl. No.: 15/148,855

(22) Filed: May 6, 2016

(65) Prior Publication Data
US 2016/0356662 A1 Dec. 8, 2016

Related U.S. Application Data

(60) Provisional application No. 62/158,658, filed on May 8, 2015.

(51) Int. Cl.
*G01L 5/16* (2006.01)
*G01L 1/22* (2006.01)
*G01L 5/22* (2006.01)

(52) U.S. Cl.
CPC .............. *G01L 5/16* (2013.01); *G01L 1/2206* (2013.01); *G01L 1/2218* (2013.01); *G01L 1/2225* (2013.01)

(58) Field of Classification Search
CPC ....... G01L 1/2218; G01L 1/2225; G01L 5/16; G01L 5/161; G01L 5/167
See application file for complete search history.

(56) References Cited

U.S. PATENT DOCUMENTS

| | | | |
|---|---|---|---|
| 3,377,849 A | 4/1968 | Lebow et al. | |
| 3,618,376 A | 11/1971 | Shull et al. | |
| 3,693,425 A | 9/1972 | Starita et al. | |

(Continued)

FOREIGN PATENT DOCUMENTS

| | | |
|---|---|---|
| DE | 2302540 | 7/1974 |
| DE | 3313960 | 10/1983 |

(Continued)

OTHER PUBLICATIONS

International Search Report and Written Opinion for International patent application No. PCT/US2016/031303, dated Jul. 8, 2016.

(Continued)

*Primary Examiner* — Herbert K Roberts
(74) *Attorney, Agent, or Firm* — Steven M. Koehler; Westman, Champlin & Koehler, P.A.

(57) ABSTRACT

A load cell body for transmitting forces and moments in plural directions is disclosed. The load cell body comprises a first member, a second member and a plurality of pairs of support columns. The second member includes a plurality of apertures, where a portion of a plurality of portions of the first member extends into each aperture. The plurality of pairs of support column columns are configured for each portion of the first member and the corresponding aperture of the second member, such that each pair of support columns connects the corresponding portion of the first member to the second member.

17 Claims, 10 Drawing Sheets

(56) References Cited

U.S. PATENT DOCUMENTS

| | | |
|---|---|---|
| 372,990 A | 5/1973 | Oliver |
| 3,771,359 A | 11/1973 | Shoberg |
| 3,780,573 A | 12/1973 | Reus |
| 3,867,838 A | 2/1975 | Gerresheim |
| 3,939,704 A | 2/1976 | Zipin |
| 4,023,404 A | 5/1977 | Brendel |
| 4,171,641 A | 10/1979 | Landsness |
| 4,297,877 A | 11/1981 | Stahl |
| 4,448,083 A | 5/1984 | Hayashi |
| 4,483,203 A | 11/1984 | Capper |
| 4,488,441 A | 12/1984 | Ramming |
| 4,493,220 A | 1/1985 | Carignan et al. |
| 4,499,759 A | 2/1985 | Hull |
| 4,550,617 A | 11/1985 | Fraignier et al. |
| 4,573,362 A * | 3/1986 | Amlani ................ G01L 1/2218 73/862.044 |
| 4,640,138 A | 2/1987 | Meyer et al. |
| 4,672,855 A | 6/1987 | Schmieder |
| 4,748,844 A | 6/1988 | Yoshikawa et al. |
| 4,763,531 A | 8/1988 | Dietrich et al. |
| 4,821,582 A | 4/1989 | Meyer et al. |
| 4,823,618 A | 4/1989 | Ramming |
| 5,313,828 A | 5/1994 | Kotzle et al. |
| 5,315,882 A | 5/1994 | Meyer et al. |
| 5,400,661 A | 3/1995 | Cook et al. |
| 5,540,108 A | 7/1996 | Cook et al. |
| 5,894,094 A | 4/1999 | Kuchler et al. |
| 5,969,268 A | 10/1999 | Sommerfeld et al. |
| 6,038,933 A | 3/2000 | Meyer |
| 6,769,312 B2 | 8/2004 | Meyer et al. |
| 2002/0059837 A1 | 5/2002 | Meyer et al. |
| 2006/0107761 A1 | 5/2006 | Meyer |

FOREIGN PATENT DOCUMENTS

| | | |
|---|---|---|
| EP | 0816817 | 1/1998 |
| EP | 2549253 A1 | 1/2013 |
| GB | 2096777 | 10/1982 |
| JP | S52133270 A * | 4/1976 |
| WO | 2006058284 A1 | 6/2006 |

OTHER PUBLICATIONS

European Office Action, dated Sep. 17, 2018 for corresponding European Patent Application No. 16724207.2, filed May 19, 2016.
Communication from the European Patent Office for European patent application No. 16724207.2, dated Apr. 9, 2019.
First Office Action from the Chinese Patent Office for Chinese patent application No. 201680026522.6, dated Jun. 5, 2019, with English translation.

* cited by examiner

MULTI AXIS LOAD CELL BODY

BACKGROUND

The present invention relates to a load cell that transmits and measures linear forces along and moments about up to three orthogonal axes.

Transducers or load cells for determining forces along and moments about three orthogonal axes are known. Two such load cells are disclosed in U.S. Pat. Nos. 4,640,138 and 4,821,582. U.S. Pat. No. 4,640,138 illustrates a multiple axis load-sensitive transducer having inner and outer members that are joined by a pair of axially spaced spiders. The spiders comprise arms that are integral with the inner member and are connected to the outer member by flexible straps that have longitudinal links with the ends of the straps fixed to the outer member. The arms of the spiders are fixed to the center of the associated strap. Loads are sensed as a function of bending on the spider arms.

U.S. Pat. No. 4,821,582 illustrates a load transducer that measures linear forces in three axes and moments about two of the axes. The transducer has inner and outer structures connected by load sensitive spider arms or shear beams. The outer ends of the spiders are connected to outer links which are stiff when the inner structure is loaded in a direction along an axis perpendicular to the plane of the spider.

SUMMARY

This Summary and the Abstract herein are provided to introduce a selection of concepts in a simplified form that are further described below in the Detailed Description. This Summary and Abstract are not intended to identify key features or essential features of the claimed subject matter, nor are they intended to be used as an aid in determining the scope of the claimed subject matter. The claimed subject matter is not limited to the implementations that solve any or all disadvantages noted in the background.

A first aspect of the invention includes a load cell body for transmitting forces and moments in plural directions. The load cell body comprises a first member. The load cell body also comprises a second member having a plurality of apertures, where a portion of a plurality of portions of the first member extends into each aperture. The load cell body also includes a plurality of pairs of support columns for each portion of the first member and corresponding aperture of the second member, where each pair of support columns connects the corresponding portion of the first member to the second member.

A second aspect of the invention includes a load cell body for transmitting forces and moments in plural direction, which includes a first member, a second member, and a plurality of pairs of support columns. The second member includes a first perimeter portion and a second perimeter portion and a cavity extending from the first perimeter portion to the second perimeter portion. The plurality of pairs of support columns connect the first member to the second member. The first member is disposed in the cavity between the first perimeter portion and the second perimeter portion. A first support column and a second support column of each pair of support columns extend in opposed directions from the first member.

One or more of the following features can be included in the system or method above in further embodiments thereof.

A load cell body can be provided such that each pair of support columns comprises a first support column connecting a first side of the first member to the second member and a second support column connecting a second side of the first member to the second member. The second side of the first member is opposite to the first side of the first member.

Longitudinal axes of the first support column and the second support column of each pair of support columns are aligned along a common axis. The plurality of pairs of support columns include a first set of pairs of support columns having associated common axes parallel to each other, and a second set of pairs of support columns having associated common axes parallel to each other and orthogonal to the common axes of the first set of pairs of support columns. In one embodiment, the plurality of pairs of support columns include a third set of pairs of support columns having associated common axes parallel to each other and orthogonal to the common axes of the first set of pairs of support columns and orthogonal to the common axes of the second set of pairs of support columns. The common axes of the first set of support columns, the second set of support columns, and the third set of support columns are disposed at equal angular intervals about a reference axis extending through a center of the first support member. Each pair of support columns of the second set of support columns and the third set of support columns are disposed between adjacent pairs of support columns of the first set. In one embodiment, the first member comprises a plate.

The second member comprises a structure having a rigid first perimeter portion and a second perimeter portion and at least one support extending between the first perimeter portion and the second perimeter portion. The at least one support can include at least three support. Each corner of the second member includes an aperture. Also, each support comprises a wall having an aperture spaced apart from each corner aperture.

Each portion of the first member includes a first side and a second side facing in opposite directions. A first support column of the each pair of support columns extends from the first side of each portion of the first member and is connected to the second member. A second support column of the each pair of support columns extends in a direction opposite the first support column from the second side of the portion of the first member and is connected to the second member The support columns are of the same shape. Opposite facing surfaces of at least some of the portions of the first member face away from each other. In another embodiment, opposite facing surfaces of at least some of the portions of the first member face toward each other. Due to the arrangement of the components, the first member, the second member and the plurality of columns can be an integral assembly being formed of a single unitary body using standard machining techniques.

DETAILED DESCRIPTION OF ILLUSTRATIVE EMBODIMENTS

Figure 1:
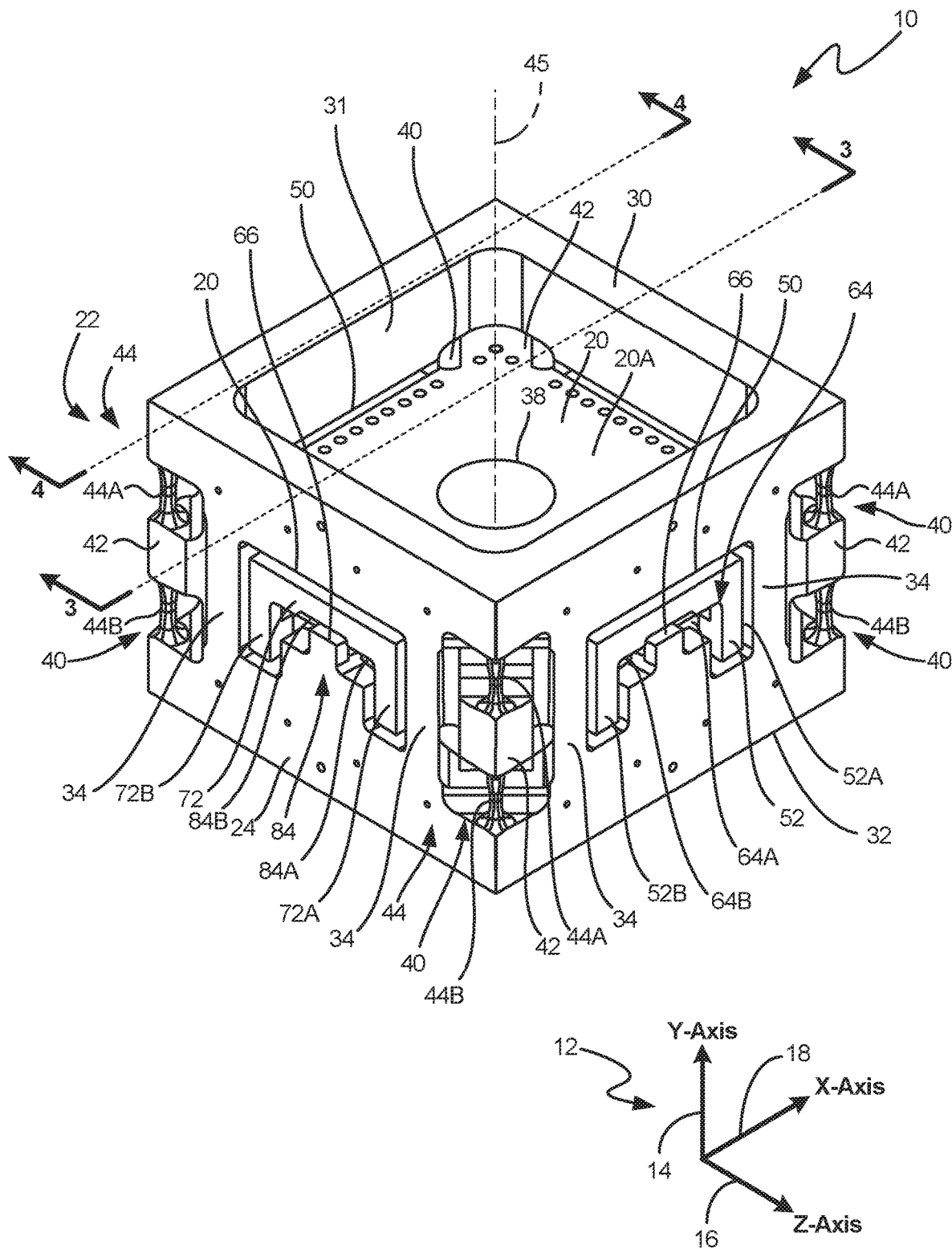
FIG. 1 is a perspective view of a load cell.

An exemplary embodiment of a load cell 10 is illustrated in FIGS. 1-7. However, before describing further aspects of the load cell 10, for purposes of explanation, forces and moments are measured with respect to a stationary orthogonal coordinate system 12. In an exemplary coordinate system, a Y-axis 14 extends through the load cell 10. A Z-axis 16 is perpendicular to the Y-axis 14. An X-axis 18 is mutually perpendicular to the Y-axis 14 and the Z-axis 16.

Figure 2:
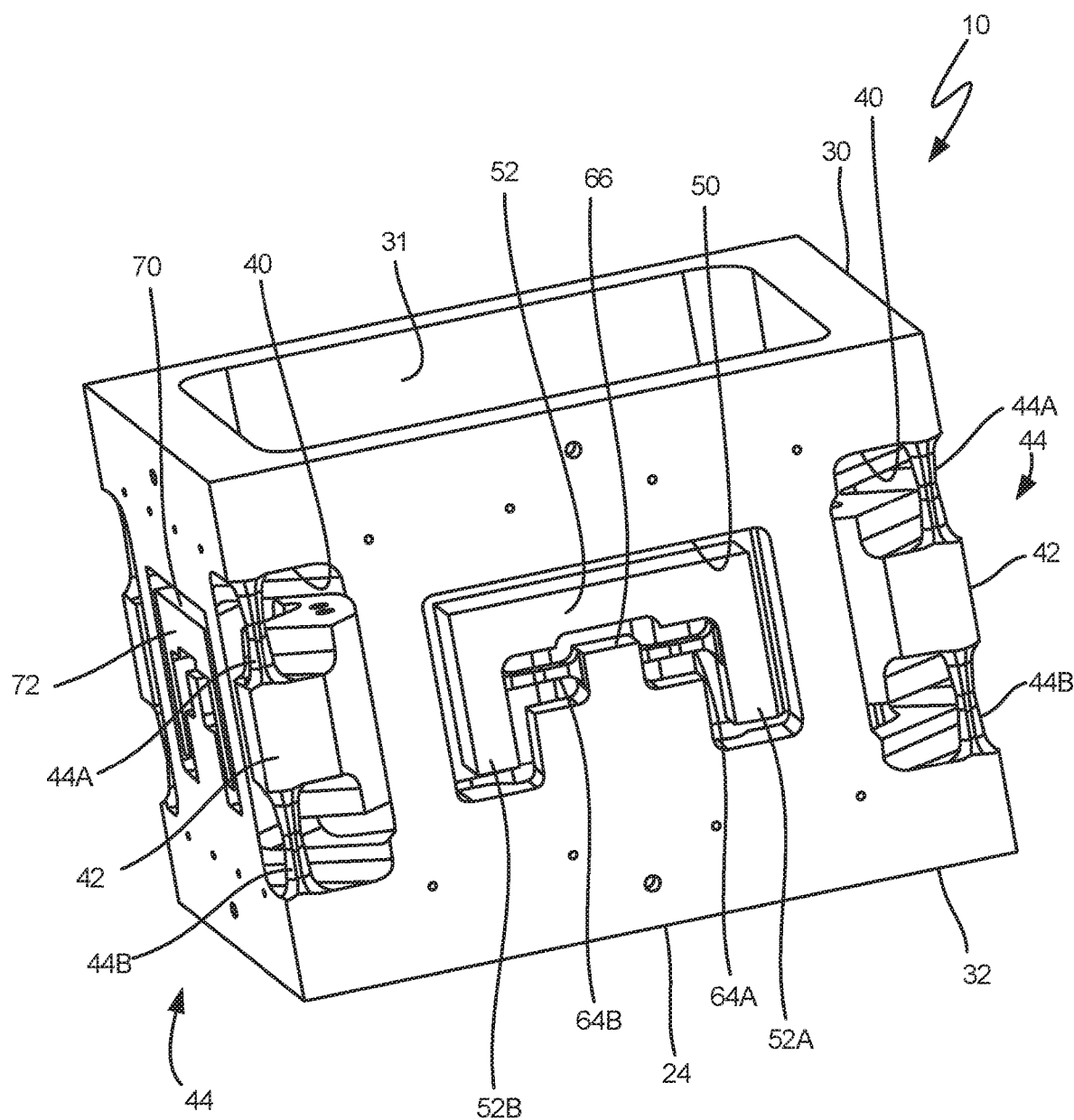
FIG. 2 is a second perspective view of the load cell.
Figure 3:
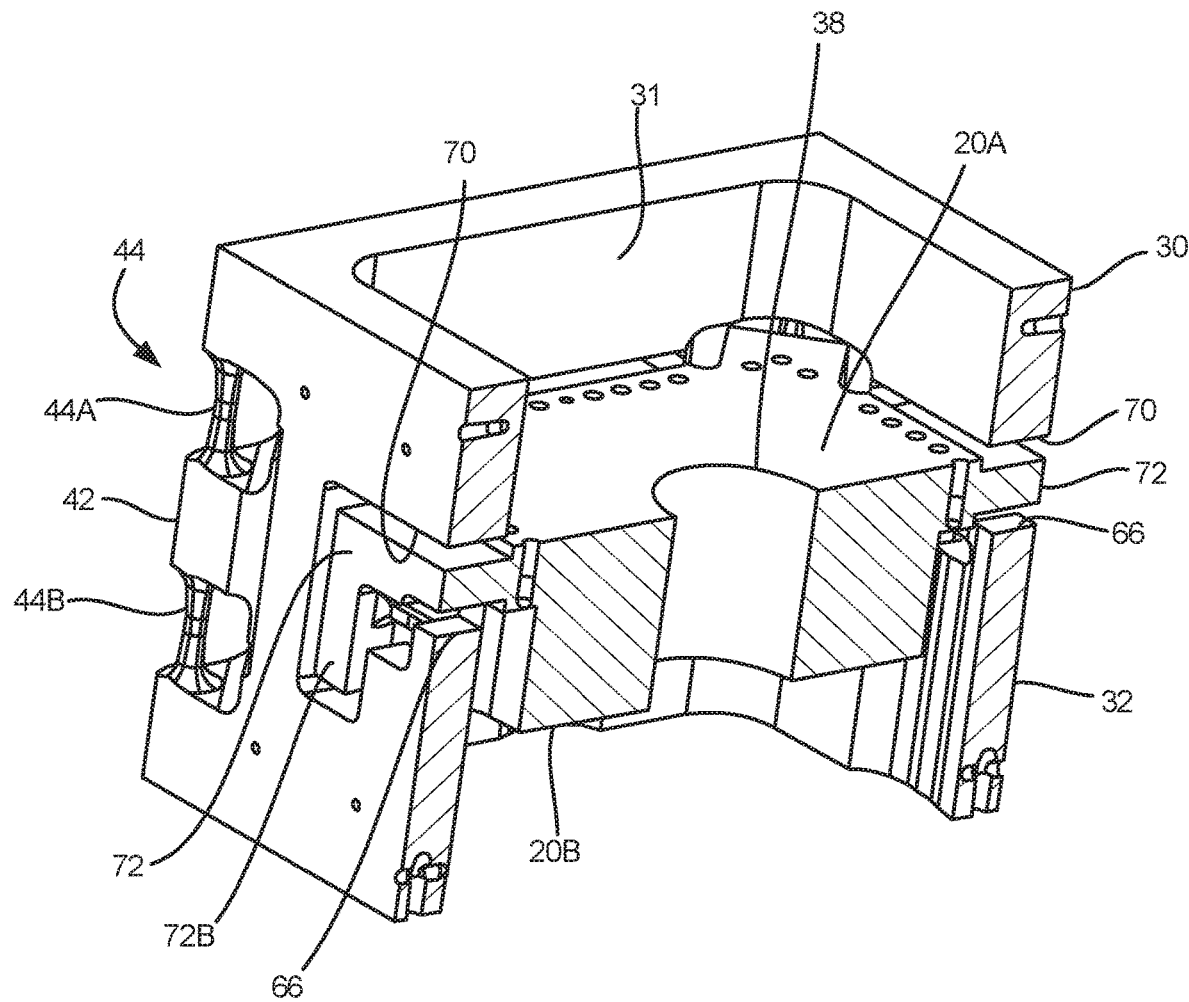
FIG. 3 is a sectional view of the load cell taken along lines 3-3 of FIG. 1.
Figure 4:
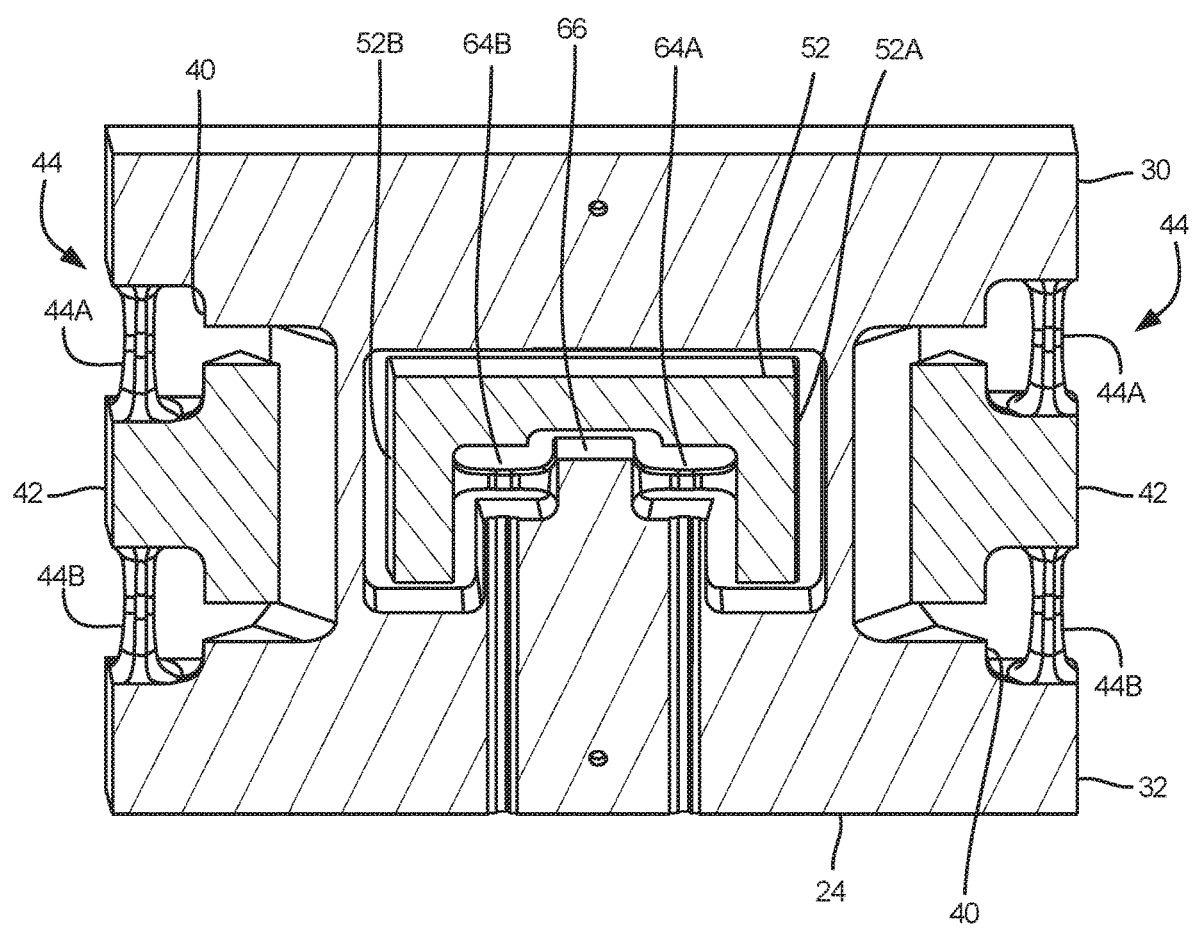
FIG. 4 is a sectional view of the load cell taken along lines 4-4 of FIG. 1.
Figure 5:
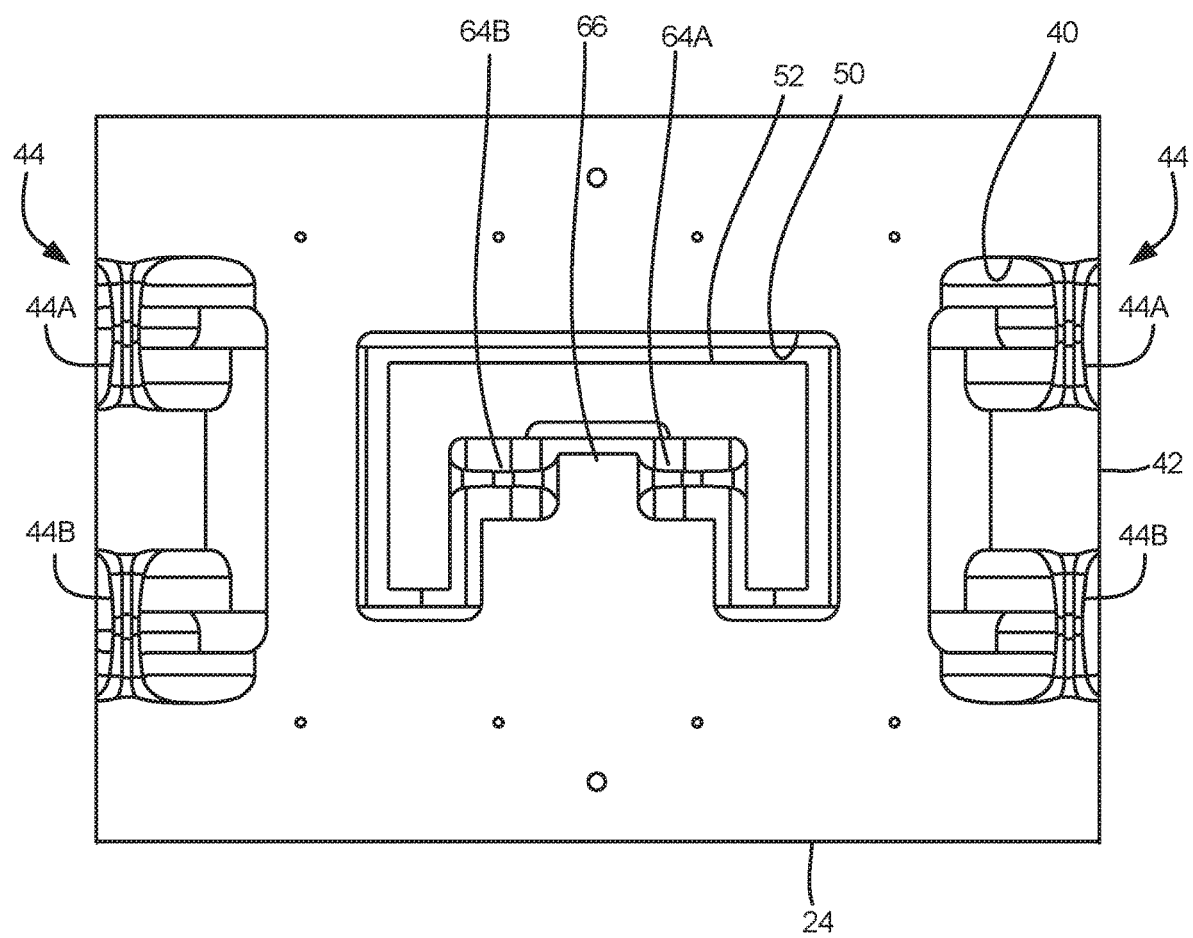
FIG. 5 is a side elevational view of the load cell, other sides being identical.
Figure 6:
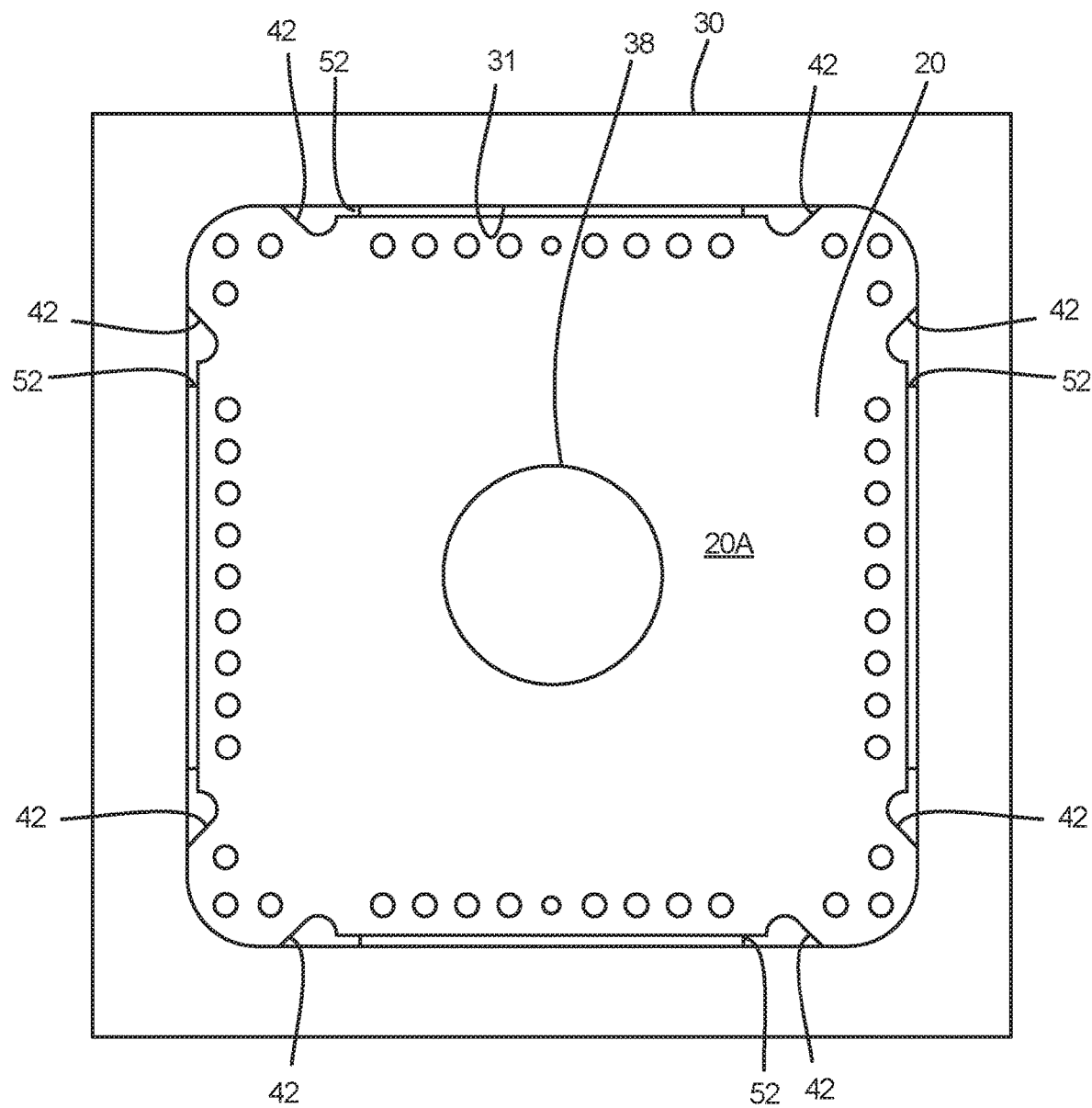
FIG. 6 is a top plan view of the load cell.
Figure 7:
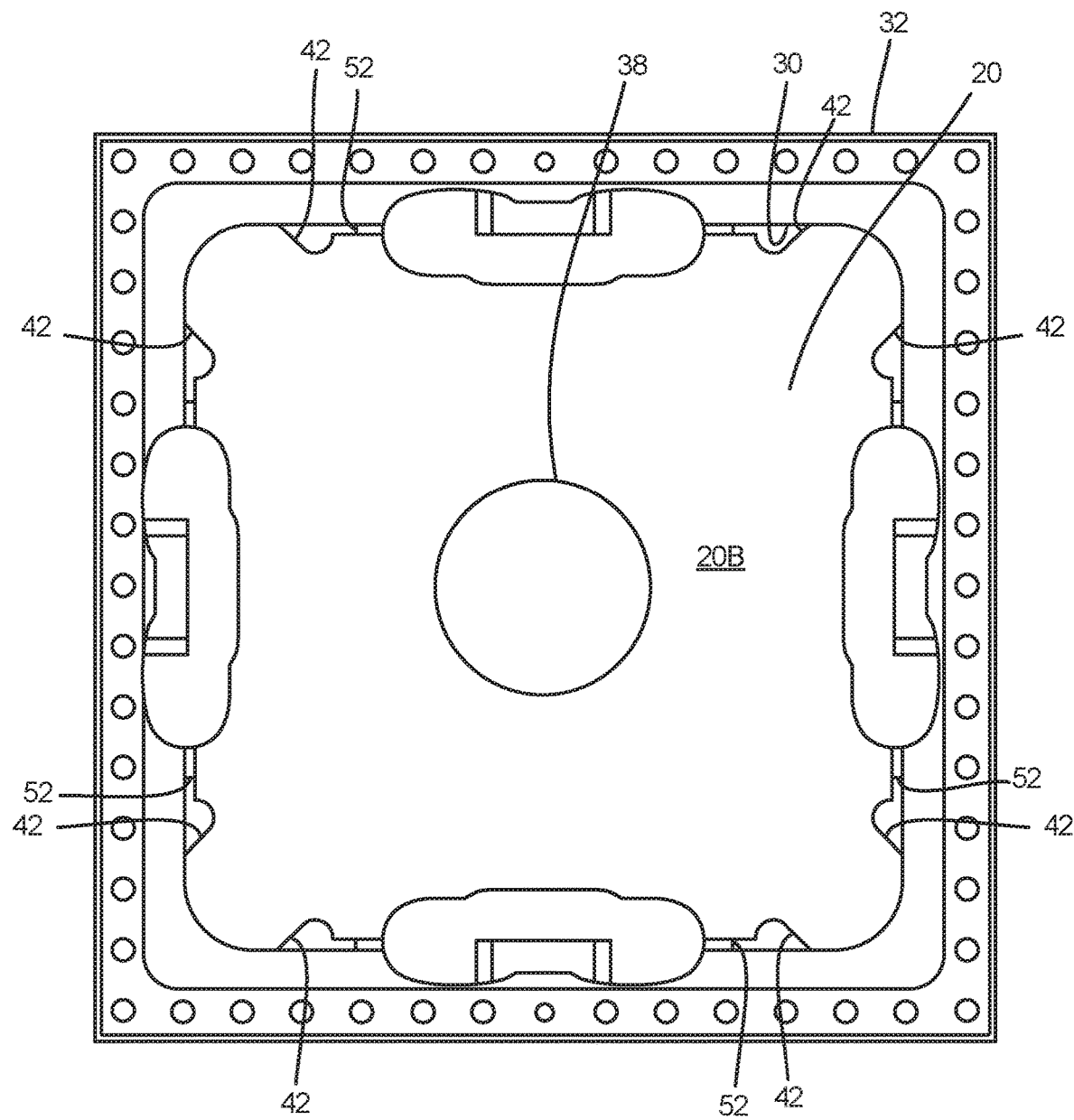
FIG. 7 is a bottom plan view of the load cell.

Referring to FIGS. 1-3, the load cell 10 includes a first member 20 connected by a plurality of columns 22, described below in more detail, to a second member 24. When equipped with suitable sensing devices, the load cell body 10 can sense forces and moments in up to six degrees of freedom. In a common implementation, the second member 24 is grounded or otherwise is fixed relative to the set of axes 12 while the first member 20 moves relative to the second member 24, being supported on the second member 24 by the plurality of columns 22. However, again this is but one implementation and if desired, the first member 20 can be fixed relative to the set of axes 12 while the second member 24 moves relative thereto.

The second member 24 includes a plurality of apertures 40 through which portions of the first member 20 extend into so that a pair of columns 44 connects each of the portions of the first member 20 to the second member 24, the columns 44 being joined to and extending between portions of the first member 20 and the second member 24 that generally face each other.

The second member 24 is in the form of a frame or cage having a rigid first perimeter portion 30 and a rigid second perimeter portion 32 and a cavity 31 extending from the first perimeter portion 30 to the second perimeter portion 32. A plurality of supports 34 rigidly connects the first perimeter portion 30 to the second perimeter portion 32. The plurality of supports 32 can be considered wall(s) with apertures provided therein. Although the portions or components 30, 32 and 34 could be manufactured as one or more separate elements in a particularly advantageous embodiment, the second member 24 comprising components 30, 32 and 34 are integral with each other being formed from a single unitary body.

The first member 20 is disposed in the cavity 31 and spaced part from inner surfaces of the second member 24. The plurality of columns 22 connects the first member 20 to the second member 24, but allow free movement of the first member 24 in the cavity 31.

As indicated above, the first member 20 can have portions extending within the apertures of the second member 24. As shown in FIG. 3, the first member 20 herein is generally a rigid plate having opposed planar surfaces 20A and 20B. If desired, one or more apertures can be provided through the first member 20 so as to enable the first member 20 to be connected to a body (not shown). In the embodiment illustrated, a single center aperture 38 is illustrated and extends through the first member 20; however, this should not be considered limiting.

Portions of the first member 20 extending into the apertures of the second member 24 can be generally organized in three sets. A first set of apertures are identified at 40. These apertures generally define a space between the first rigid perimeter 30 and the second rigid perimeter 32. A portion 42 of the first member 20 extends into each of the apertures 40. A pair of support columns 44 connects the portion 42 to each of the first perimeter portion 30 and the second perimeter portion 32. The support columns 44A and 44B are joined to portion 42 on sides that face away from each other. In particular, a first column 44A connects portion 42 to the first perimeter portion 30, while a second column 44B connects the portion 42 to the second perimeter portion 32. The columns 44A and 44B of each pair 44 are aligned with each other (longitudinal axes of columns 44A and 44B are on the same common axis) and herein are oriented parallel to the Y-axis 14.

At this point it should be noted that in the embodiment illustrated, the second member 24 is generally a rectangular block having the apertures 40 disposed in each corner of the rectangular block. Hence, four apertures 40 are provided; however, this should not be considered limiting. In another embodiment, the first member 20 and the second member 24 can be triangular in shape where three of the apertures 40 are provided, one in each corner. In yet other alternative embodiments, other shapes of the first member 20 and the second member 24 can be used. For instance, the first member 20 and second member 24 each are circular in shape where again at least three of the apertures 40 are provided through a single generally cylindrical wall with the corresponding portions 42 extending therein. Hence, in such an embodiment, any number of apertures 40 can be provided, although typically the apertures 40 are provided at equal angular intervals in the second member 24 about a reference axis 45 extending through the center of the first member 20, herein along a longitudinal axis of aperture 38. Likewise, in yet more embodiments, the first member 20 and the second member 24 can comprise other geometric shapes, such as, but not limited to, a hexagon or an octagon where again apertures 40 are provided in each of the corners where adjacent walls come together.

A second set of apertures 50 is provided and disposed between adjacent pairs of the apertures 40 (and also spaced at equal angular intervals about the reference axis 45). A portion 52 of the first member 20 extends into each of the apertures 50. A pair of columns (herein illustrated as being horizontal) 64 connect the first member 20 to a portion 66 of the second member 24. In the embodiment illustrated the portion 52 includes opposed legs or standoffs 52A and 52B. The standoffs 52A and 52B extend into the apertures between the first perimeter portion 30 and the second perimeter portion 32. As such the support columns 64 are joined to portion 66 and legs 52A and 52B on sides that face toward each other. In particular, a first support column 64A connects the first leg 52A to the portion 66 of the second member 24, while a second support column 64B connects the second leg 52B to the portion 66 of the second member 24. The apertures 50 and corresponding portions 52 are disposed on opposite sides of the first member 20, while the support column 64A and 64A are aligned with each other (longitudinal axes of columns 64A and 64B are on the same common axis) and configured to be parallel to the X-axis 18.

In a manner similar to the configuration of aperture 50 and portion 52, a third set of apertures 70 are provided in the second member 24 with a portion 72 of the first member 20 extending into each aperture 70. As shown in FIG. 3, each aperture 70 is disposed between adjacent pairs of apertures 40. In a manner similar to portion 52, portion 72 includes legs 72A and 72B, which are connected to a portion 66 of the second member 24 with a pair of support columns 84 comprising aligned support columns 84A and 84B that connect each of the legs 72A and 72B to the second member 24. However, columns 84A and 84B are aligned with each other and are parallel to the Z-axis 16.

There are thus two pairs of columns 64, which are normal to the YZ plane and are oriented with the X-axis 18 to transmit a force (component) $F_X$; four pairs of columns 44, which are normal to the XZ plane and are oriented with the Y-axis 14 to transmit a force (component) $F_Y$; and two pairs of columns 84, which are normal to the XY plane and are oriented with the Z-axis 16 to transmit a force (component) $F_Z$. These columns have dimensions sized such that a pure force load will predominantly be carried by the columns as indicated above along each respective axis. For example, a pure $F_X$ force acting on the center of the first member 20 will carry the majority of this load through the $F_X$ columns 64 with very little being carried by the $F_Y$ columns 44 or the $F_Z$ columns 84. In a preferred embodiment, all the columns 64A, 64B, 84A and 84B have longitudinal axes that lie in a common plane that is parallel to the XZ plane.

Figure 8:
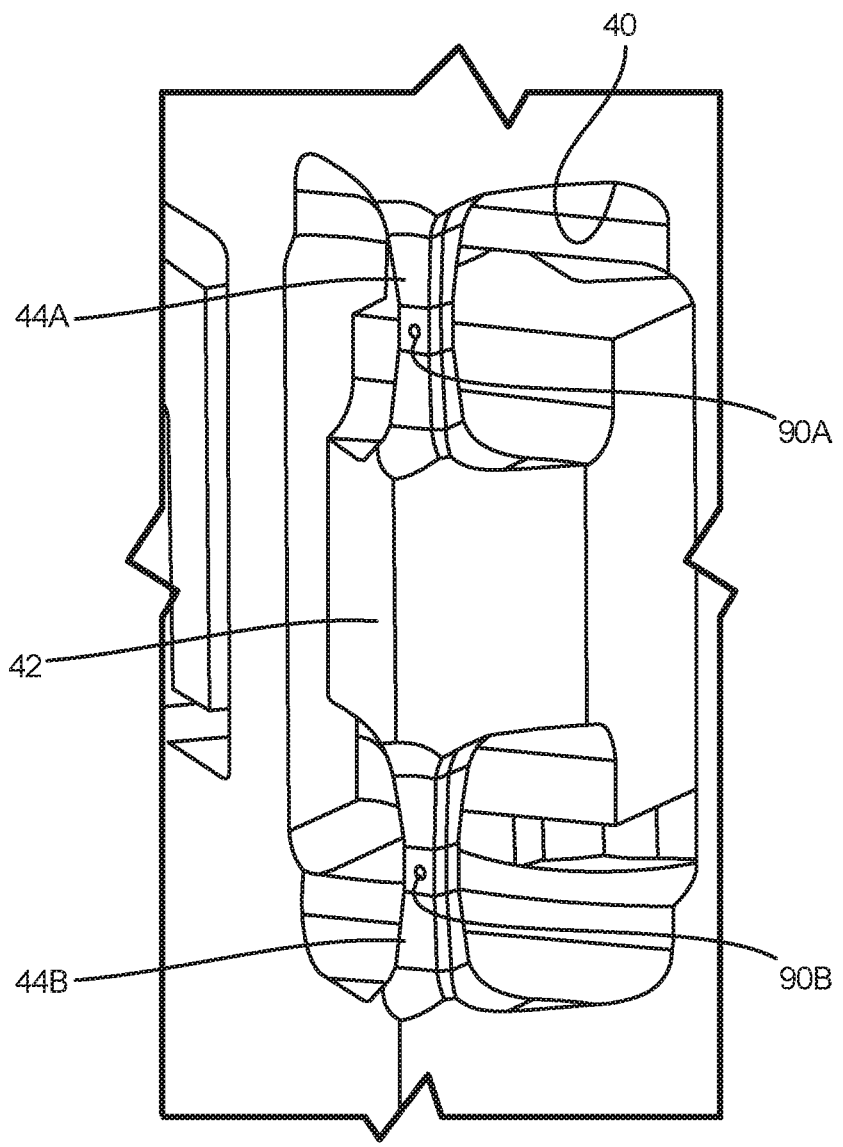
FIG. 8 is a perspective view of a pair of support columns.

The columns 44, 64, 84 can be instrumented with many forms of suitable sensors such as strain gages to measure tension and compression in conventional Wheatstone bridges. By way of example, FIG. 8 illustrates support columns 44A and 44B with strain gauges 90A and 90B. Because of this design, all the Wheatstone bridges are fully active. Stated another way, loads are sensed in the individual columns of the pairs of columns 44, 64, 84 both in compression and tension when a load in one direction is applied. For instance, when a positive $F_Y$ load is applied, columns 44A (one support column 44A provided on each corner of the load body 10) are in compression while columns 44B are in tension. This differs from conventional axial force measurement through strain gauge instrumentation where gauges are laid orthogonally and measure axial strain and Poisson strain. Since a fully active bridge measures the full load in tension and compression, its output is higher than an axial/Poisson sensor. Furthermore, very little of the shunted load through the other columns will register as output on the transducer because all the columns are typically gauged to measure axial force and effectively reject double-cantilever bending.

Figure 9:
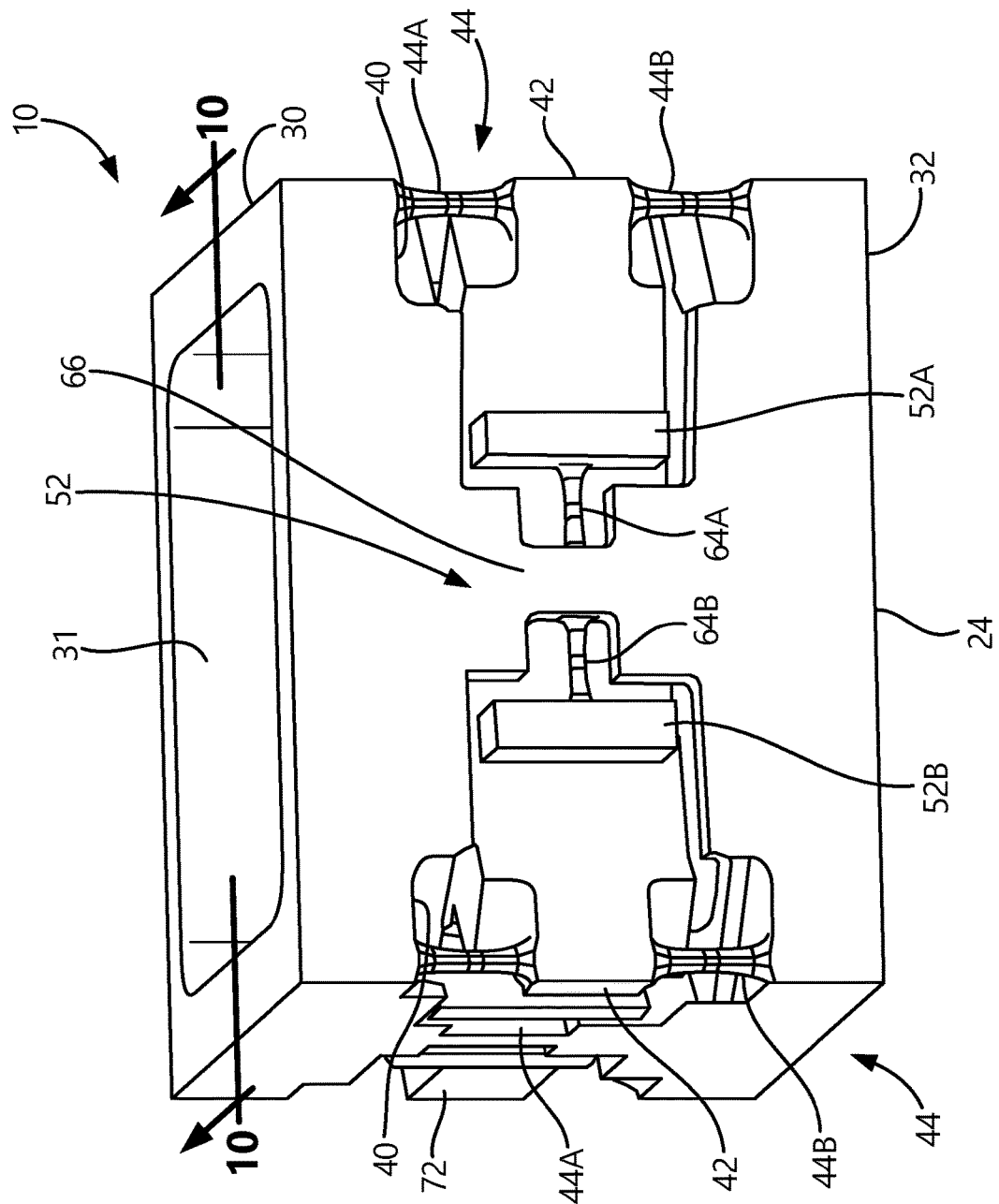
FIG. 9 is a perspective view of an second embodiment of a load cell.
Figure 10:
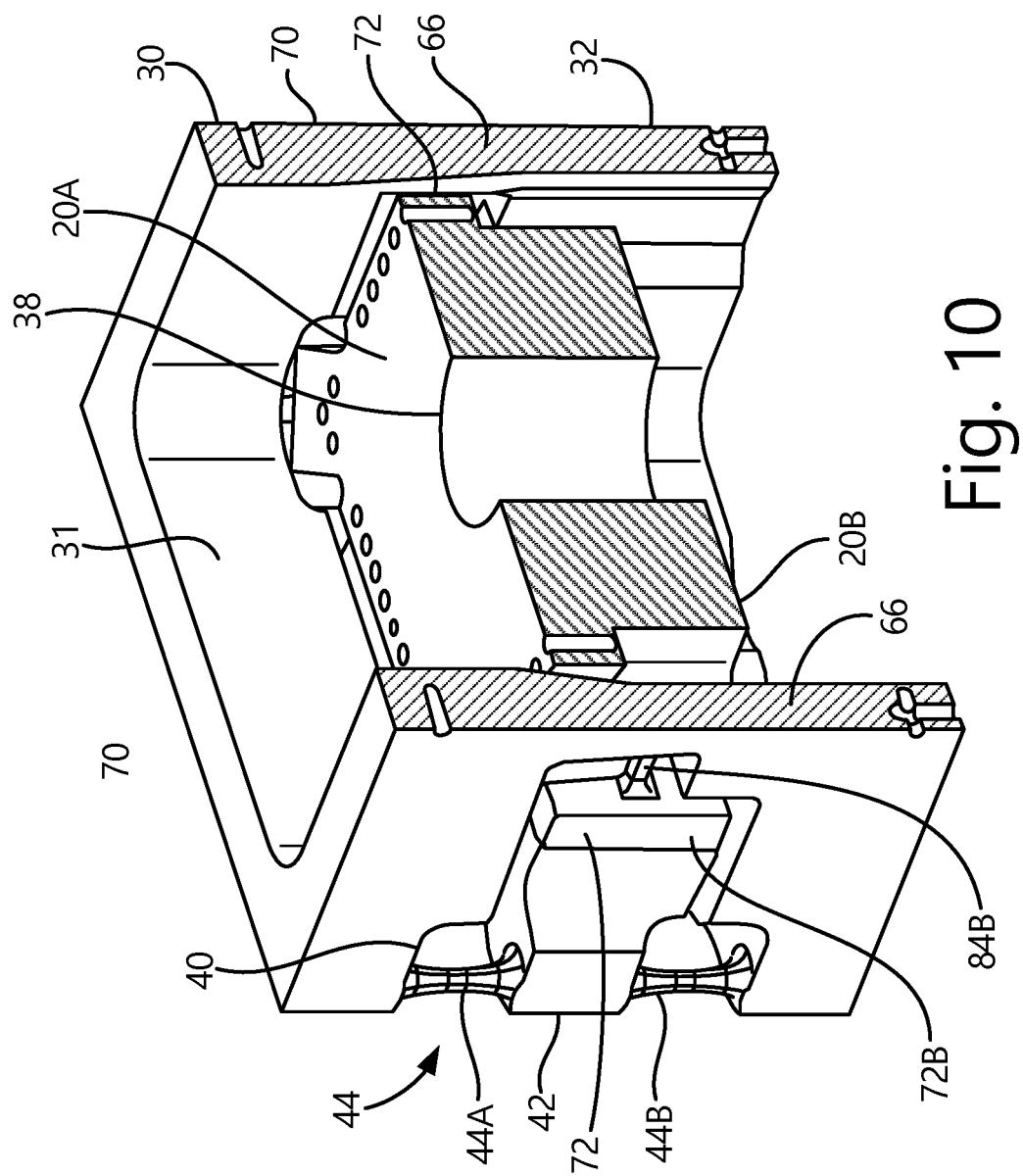
FIG. 10 is a sectional view of the load cell taken along lines 10-10 of FIG. 9.

An alternative embodiment of a load cell body 10' is illustrated in FIGS. 9-10. Similar features and/or components respect to the load cell body 10 have been identified with the same reference numbers. The load cell body 10' includes a single support 66 disposed between successive apertures 40 that connects the rigid first perimeter portion 30 and a rigid second perimeter portion 32. In the embodiment illustrated, the apertures 40 extend along the sides of the member 24. It should be noted that the width of each single support 66 on each side of member 24 can be varied as necessary to obtain the desired stiffness of the member 24. Referring to FIG. 9 and like load body 10, a pair of columns (herein illustrated as being horizontal) 64 connect the first member 20 to the portion 66 of the second member 24. In the embodiment illustrated the portion 52 includes opposed legs or standoffs 52A and 52B. The standoffs 52A and 52B extend into the apertures between the first perimeter portion 30 and the second perimeter portion 32. As such the support columns 64 are joined to portion 66 and legs 52A and 52B on sides that face toward each other. In particular, a first support column 64A connects the first leg 52A to the portion 66 of the second member 24, while a second support column 64B connects the second leg 52B to the portion 66 of the second member 24. The apertures 50 and corresponding portions 52 are disposed on opposite sides of the first member 20, while the support column 64A and 64A are aligned with each other (longitudinal axes of columns 64A and 64B are on the same common axis) and configured to be parallel to the X-axis 18. FIG. 10 illustrates that similar support columns (e.g. support column 84B) are arranged in a manner similar to support columns 64A and 64B for sides of the member 24 that are orthogonal to the sides having support columns 64A and 64B for the reasons discussed above with respect to load cell body 10.

It should be noted that the shape of the columns can take a number of different forms when viewed in cross-section. For instance, the columns can be of constant area in cross-section, or the columns can be tapered as illustrated in the embodiment of FIGS. 1-10, which reduces the stress gradient through the column induced by bending from off-axis load and end effects. Also, the load-carrying capabilities of the columns can be adjusted depending upon the forces to be measured. For instance, if force loads in the Y-axis direction are considerably higher than those present in the X-axis or Z-axis directions, the size of the support columns 44, 64 and 84 can be adjusted as necessary.

Although the subject matter has been described in language directed to specific environments, structural features and/or methodological acts, it is to be understood that the subject matter defined in the appended claims is not limited to the environments, specific features or acts described above as has been held by the courts. Rather, the environments, specific features and acts described above are disclosed as example forms of implementing the claims.

What is claimed is:

1. A load cell body for transmitting forces and moments in plural directions, the load cell body comprising:
   a first member;
   a second member having at least six spaced apart apertures, wherein a separate portion of the first member extends into each aperture; and
   at least six pairs of support columns, wherein a pair of support columns is provided for each portion of the first member and corresponding aperture of the second member, each pair of support columns connecting the corresponding portion of the first member to the second member, wherein each pair of support columns comprise a first support column extending in each corresponding aperture and a second support column extending in each corresponding aperture, the second support column extending in an opposite direction from the first member and wherein longitudinal axes of the first support column and the second support column of each pair of support columns are aligned along a common axis, and wherein the at least six pairs of support columns comprise:
     a first set of pairs of support columns having associated common axes parallel to each other;
     a second set of pairs of support columns having associated common axes parallel to each other and orthogonal to the common axes of the first set of pairs of support columns; and
     a third set of pairs of support columns having associated common axes parallel to each other and orthogonal to the common axes of the first set of pairs of support columns and orthogonal to the common axes of the second set of pairs of support columns.

2. The load cell body of claim 1, wherein each pair of support columns connecting the first member to the second member comprises the first support column connecting a first side of the first member to the second member and the second support column connecting a second side of the first member to the second member, the second side of the first member being opposite to the first side of the first member.

3. The load cell body of claim 1, wherein the common axes of the first set of pairs of support columns are disposed at equal angular intervals about a reference axis extending through a center of the first member.

4. The load cell body of claim 3, wherein the common axes of the second set of pairs of support columns are disposed at equal angular intervals about the reference axis extending through the center of the first member.

5. The load cell body of claim 4, wherein the common axes of the third set of pairs of support columns are disposed at equal angular intervals about the reference axis extending through the center of the first member.

6. The load cell body of claim 4, wherein each pair of support columns of the second set of support columns are disposed between adjacent pairs of support columns of the first set.

7. The load cell body of claim 5, wherein each pair of support columns of the third set of support columns are disposed between adjacent pairs of support columns of the first set.

8. The load cell body of claim 1, wherein the first member comprises a plate.

9. The load cell body of claim 1, wherein the second member comprises a structure having a rigid first perimeter portion and a second perimeter portion and at least one support extending between the first perimeter portion and the second perimeter portion.

10. The load cell body of claim 9, wherein the at least one support comprises at least three supports.

11. The load cell body of claim 10, wherein each corner of the second member includes an aperture.

12. The load cell body of claim 11, wherein each support comprises a wall having an aperture spaced apart from each corner aperture.

13. The load cell body of claim 1, wherein each portion of the first member includes a first side and a second side facing in opposite directions, wherein the first support column of each pair of support columns extends from the first side of each portion of the first member and is connected to the second member, and wherein the second support column of the each pair of support columns extends in a direction opposite the first support column from the second side of the portion of the first member and is connected to the second member.

14. The load cell body of claim 1, wherein the support columns are of the same shape.

15. The load cell body of claim 1, wherein surfaces of at least some of the portions of the first member to which the support columns are joined face away from each other.

16. The load cell body of claim 1, wherein surfaces of at least some of the portions of the first member to which the support columns are joined face toward each other.

17. The load cell body of claim 1, wherein the first member, the second member and the at least six pairs of support columns are an integral assembly being formed of a single unitary body.

* * * * *